United States Patent [19]
Bolton et al.
[11] 3,868,484
[45] Feb. 25, 1975

[54] POWER FEED ARRANGEMENT FOR COMMUNICATION SYSTEMS

[75] Inventors: Leslie John Bolton, Kent; Brian Hall, Copthorne, both of England

[73] Assignee: The Post Office, London, England

[22] Filed: Dec. 11, 1972

[21] Appl. No.: 313,677

[30] Foreign Application Priority Data
Dec. 15, 1971 Great Britain .................. 58244/71

[52] U.S. Cl. .................. 179/170 J
[51] Int. Cl. .................. H04b 3/44
[58] Field of Search ....... 179/170 J, 175.2 C, 175.3, 179/170 A; 340/253

[56] References Cited

UNITED STATES PATENTS

| | | | |
|---|---|---|---|
| 2,574,458 | 11/1951 | Atkinson et al. | 340/163 |
| 2,657,279 | 10/1953 | Kelly | 179/170 J |
| 2,768,353 | 10/1956 | Mansson | 333/16 |
| 3,521,012 | 7/1970 | Crank | 179/170 J |
| 3,748,411 | 7/1973 | Heyes et al. | 179/170 A |

*Primary Examiner*—Kathleen H. Claffy
*Assistant Examiner*—Mitchell Saffian
*Attorney, Agent, or Firm*—Hall & Houghton

[57] ABSTRACT

A power feed arrangement provided as a safety measure in a communications system of the type in which two terminal stations are connected by at least one transmission path which transmits information signals from one of the stations to the other through information signal repeating means. Two sources (one at each station) supply energizing current along the transmission path to the repeating means, and, in addition, a monitoring signal is generated at each station to be transmitted along the transmission path to the other station and detected at that other station. If one of the monitoring signals is not detected, the energizing current supply sources are disconnected from the transmission path. Provision is made to ensure that the supply sources can only be connected to the transmission path following successful transmission and detection of the monitoring signals, and for testing the current output of the sources and the impedance of the transmission path prior to operation of the system.

17 Claims, 3 Drawing Figures

POWER FEED ARRANGEMENT FOR COMMUNICATION SYSTEMS

This invention relates to a power feed arrangement for communications systems of the type in which the signal-transmitting cables include devices, such as repeaters, which require a supply of energizing current.

It is often necessary to include repeaters in the signal-transmitting cables of a communications system to compensate for attenuation of the signal. These repeaters require a supply of energizing current and in some systems the energizing current is transmitted along the same cable as the signal. This does mean, however, that a comparatively high voltage must be applied to the cable with a consequent risk to maintenance personnel and it has, accordingly, been considered advisable to restrict the current transmitted by the cable, for example to below 50 mA, to reduce this risk. In some cases, however, (high performance systems, for example) it is desirable to transmit a larger current, for example 100 mA, and it is then advisable that additional measures should be adopted to ensure the safety of personnel maintaining the cable.

The present invention provides a power feed arrangement for a communications system which includes a transmission path connecting two terminal stations to transmit information signals from one of the stations to the other station through information signal repeating means energizable by current supplied along the transmission path from two sources, one at each station, the power feed arrangement including, at each station: a monitoring signal generator operable to apply, to the transmission path, a monitoring signal which is to be transmitted to the other station, and a detector connected to the transmission path to receive the monitoring signal transmitted from the other station, the detector being operable, in response to a failure to receive a monitoring signal from the other station, to disconnect the energizing current supply sources from the transmission path.

A power feed arrangement in accordance with the invention may also include, at each station, a second detector connected to the transmission path to receive the monitoring signal applied to the transmission path at that station, the second detector being operable, in response to a failure to receive the monitoring signal applied at that station, to disconnect the energizing current supply sources from the transmission path. Preferably, the power feed arrangement includes means operable to connect the energizing current supply sources to the transmission path only in response to the detection, at both stations, of the monitoring signals applied to the transmission path at both stations.

Each detector may be operable to disconnect, from the transmission path, the energizing current supply source located at the same station. Each detector may also be operable simultaneously to terminate the application of a monitoring signal to the transmission path by the monitoring signal generator located at the same station.

A power feed arrangement in accordance with the invention may also include means operable to test the current output of the energizing current supply sources prior to operation of the monitoring signal generators. The current testing means is preferably operable in response to energization of each current supply source and may, for example, include switching means operable to connect the, or each, current supply source, through a current sensor, to an electrical load representative of the load that would normally be presented to that source by the transmission path. The arrangement is preferably such that the monitoring signal generators are operable to apply monitoring signals to the transmission path only in response to the detection, by the current testing means, of a normal current output from the energizing current supply source.

A power feed arrangement in accordance with the invention may also include means operable to test the electrical impedance of the transmission path prior to operation of the monitoring signal generators. The impedance testing means is preferably operable in response to energization of one of the, or a, energizing current supply sources and may, for example, include switching means operable to connect the transmission path, through a current sensor, to a test source of substantially lower voltage than the energizing current supply sources. The arrangement is preferably such that the monitoring signal generators are operable to apply monitoring signals to the transmission path only in response to the detection, by the impedance testing means, of a normal electrical impedance condition in the transmission path.

The power feed arrangement may also include a respective protector for each current supply source, the protector being operable in response to a voltage greater than a predetermined value at the current supply source output to disconnect the current supply source from the transmission path.

In a communications system including a power feed arrangement in accordance with the invention, the transmission path may include an electrical conductor which is connected to transmit the monitoring signals and which is separate from the conductor connected to transmit the information signals. Preferably, however, the transmission path includes an electrical conductor connected to transmit both information signals and monitoring signals and, in this case, the transmission path may include, at each repeating means a discriminating network operable to separate the monitoring signals from the information signals and to supply only the information signals to the repeater means.

In one communications system to which the invention can be applied, there are two transmission paths each having a powerfeed arrangement as defined above. The two transmission paths connect two terminal stations to transmit information signals in opposite directions from one station to the other.

By way of example, a power feed arrangement constructed in accordance with the invention will be described with reference to the accompanying drawings, in which.

Figure 1:
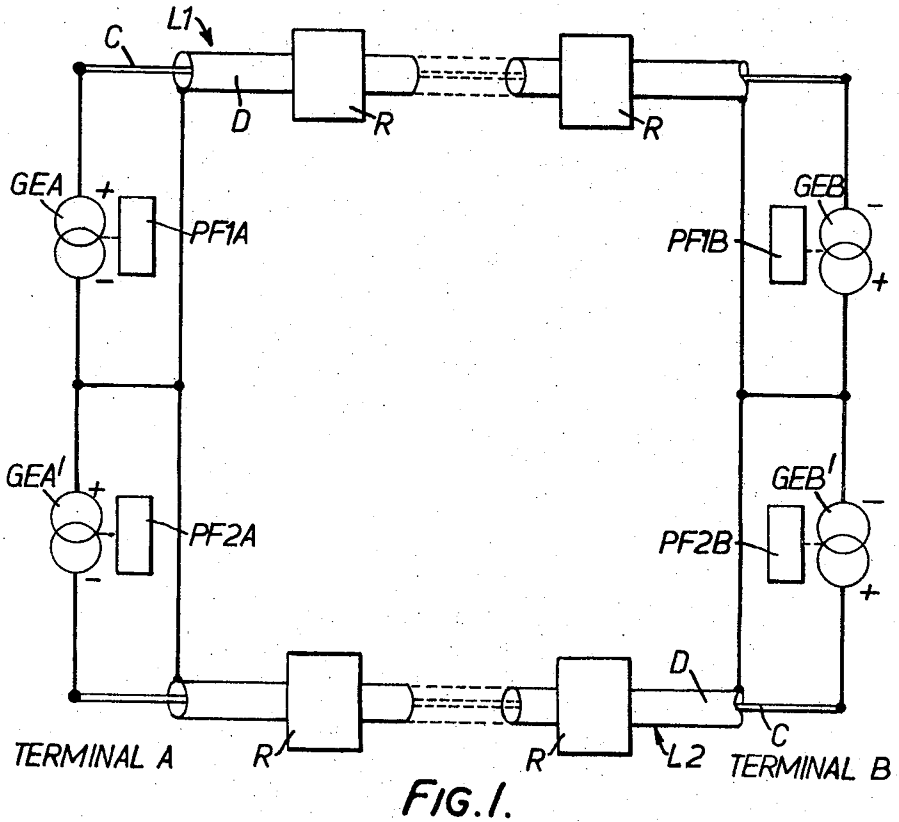
FIG. 1 is a diagram of a communications system in which two of the power feed arrangements are utilised.

FIG. 1 shows a communications system linking two terminal stations, designated "Terminal A" and "Terminal B," to transmit information signals in both directions between the stations. For transmission from Terminal A to Terminal B the stations are linked by a coaxial cable L1 and for transmission in the opposite direction the stations are linked by a coaxial cable L2. A signal to be transmitted is applied (by means not shown) to the inner conductor C of the appropriate cable and repeater amplifiers R, connected at intervals along the cable, compensate in known manner for attenuation of the signal by the cable. The outer conductors of the cables L1, L2 are indicated at D.

The repeater amplifiers R are energized, during operation of the system, by power supplied by four constant current generators two of which (GEA and $GEA^1$) are connected in series at Terminal A while the other two (GEB and $GEB^1$) are connected in series at Terminal B. The generators together provide a D.C. energizing current of about 100mA flowing from generator GEA at Terminal A through the cable L1 and associated repeaters R to generator GEB at Terminal B, and from generator $GEB^1$ at Terminal B through the cable L2 and associated repeaters R to generator $GEA^1$ at Terminal A. The junction of generators GEA and $GEA^1$ and the junction of generators GEB and $GEB^1$ are connected to the outer conductors D of the cables.

A current of 100mA is considerably greater than the limit that would normally be imposed to ensure the safety of personnel maintaining the cables L1, L2. Arrangements are, accordingly, incorporated in the system to disconnect either of the cables from the current generators whenever an abnormality in the electrical condition of that cable is detected, and also to ensure that the electrical condition of each cable and the current output of the generators is satisfactory before connections between the cables and the generators can even be effected. These safety arrangements take the form of two power feed arrangements, one for each cable: in FIG. 1, the power feed arrangement of cable L1 is indicated diagrammatically at PF1A and PF1B while that of cable L2 is indicated at PF2A and PF2B.

Figure 3:
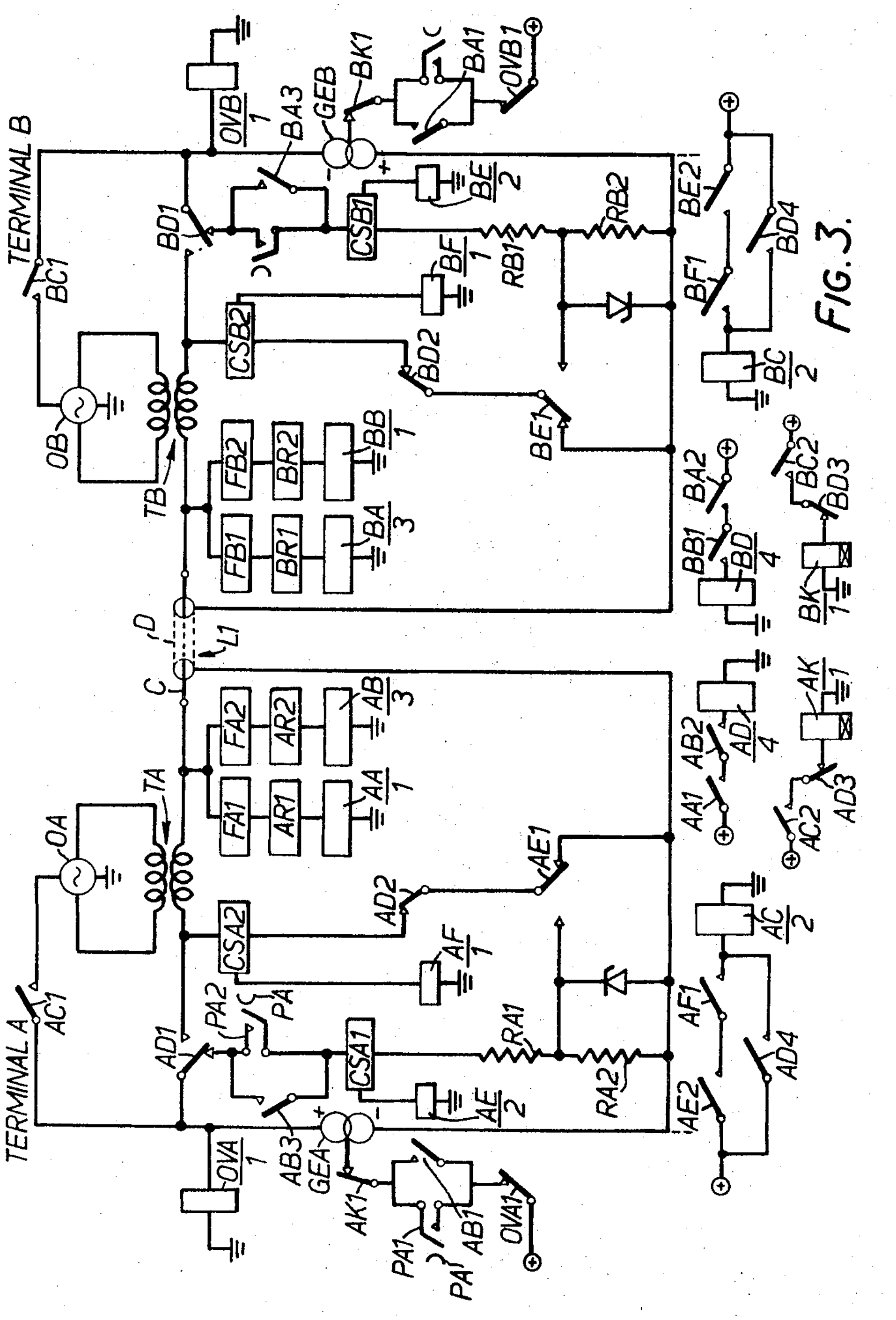
FIG. 3 is a block circuit diagram of the power feed arrangement.

FIG. 3 shows the power feed arrangement provided at Terminals A and B to ensure the safety of personnel maintaining the cable L1, that is, the power feed arrangement associated with one half only (generators GEA and GEB) of the balanced power supply. The power feed arrangement associated with the other half of the power supply (generators $GEA^1$ and $GEB^1$) to ensure the safety of personnel maintaining cable L2 has been omitted for clarity but would correspond exactly to that shown in FIG. 3 and described below.

To illustrate the manner of operation of the power feed arrangement it will be assumed that the system is initially at rest. Under these circumstances, connection between the inner conductor C of the coaxial cable L1 and the generators GEA, GEB is broken at relay contacts AD1, BD1 respectively, which are in the unoperated, or dummy-output position (this being the position shown in FIG. 3). Operation of the system can be initiated from either Terminal A or Terminal B since the circuit arrangements at the two stations are identical but it will be assumed that the system is to be started up from Terminal A. The sequence of events is then as follows.

A self-restoring push button PA at Terminal A is operated to close contact PA1 in an energizing path of the constant current generator GEA and contact PA2 in a dummy output path which includes the relay contact AD1 mentioned above. Closure of contact PA1 completes the generator energizing path through normally-closed relay contacts OVA1 and AK1, while closure of contact PA2 completes the dummy output path through the relay contact AD1, a current sensor CSA1 and series-connected dummy-load resistors RA1 and RA2. The push button PA, although self-restoring does not release immediately but only after a time delay (in practice, of the order of a fraction of a second) sufficient to allow a monitoring signal from Terminal B to be received at Terminal A as will be described below. This signal, as will also be described below, causes a relay AB at Terminal A to be operated, thereby closing relay contacts AB1 and AB3 which when push button PA releases, replace push button contacts PA1 and PA2 respectively.

For the present, however, relay AB is unoperated and push button contacts PA1 and PA2 are closed. The resistors RA1 and RA2 are chosen to simulate the load that would be presented to the generator GEA by the coaxial cable L1 under normal operating conditions and the current supplied by the generator GEA to this dummy load RA1, RA2 is checked by the current sensor CSA1: if the current is within the prescribed limits for the system, a relay AE to which the current sensor CSA1 is operably connected as indicated in FIG. 3 is actuated.

The relay AE has contacts AE1 and AE2 : contact AE1 is a changeover contact which is connected in series with a normally-closed relay contact AD2 and a current sensor CSA2 and which, when unoperated, completes a loop path between the inner and outer conductors C and D of the coaxial cable L1 as shown in FIG. 3; and contact AE2 is connected in the energizing circuit of a relay AC. Actuation of the relay AE closes contact AE2 to prepare the energizing circuit of the relay AC, and operates contact AE1 to disconnect the loop path between the conductor C, D of the coaxial cable L1 and to connect the inner conductor C of the cable to the junction between the dummy load resistors RA1, RA2 : this junction provides a low voltage tapping point so that a low value test current can flow over the inner conductor C of the cable, through the relay contacts AE1, AD2 and the current sensor CSA2 and through the corresponding elements current sensor CSB2, relay contact BD2 and unoperated relay contact BE1) at Terminal B to the outer conductor D of the cable. If the impedance of the cable L1 in within prescribed limits, the current flow through the sensors CSA2 and CSB2 will be at a specified safe level and will cause actuation of relays AF and BF respectively to which the sensors are operably connected. The current sensors CSA2 and CSB2 may be of the same form as the sensor CSA1 described above.

Relay AF at Terminal A has a contact AF1 in the energizing circuit of the relay AC. Actuation of the relay AF causes closure of the contact AF1 to complete the circuit which has been prepared by the closure of contact AE2, and so causes actuation of relay AC. Relay BF at Terminal B has a similar contact BF1 in the energizing circuit of a relay BC, but closure of contact BF1 by actuation of relay BF acts only to prepare, rather than complete, the energizing circuit of relay BC since contact BE2 (corresponding to contact AE2 at Terminal A) is as yet unoperated.

Relay AC at Terminal A has a normally-open contact AC1 in an energizing circuit from generator GEA to an oscillator OA, and a normally-open contact AC2 in the energizing circuit of a slow-operating relay AK. Closure of contact AC1 completes the energizing circuit of the oscillator OA which then functions to generate a low frequency monitoring signal $f1$, and closure of contact AC2 completes the energizing circuit of relay AK through normally-closed relay contact AD3 to initiate actuation of relay AK.

The monitoring signal $f1$ is utilised in the detection of any abnormality in the electrical condition of the cable L1 and to bring about the isolation of the cable from the generators GEA, GEB whenever any such abnormality is present, as will be described below.

The output circuit of the oscillator OA is coupled through a transformer TA to the inner conductor C of the cable L1 so that the signal $f1$, is transmitted along the cable to Terminal B. Means are provided at both Terminals A and B for detecting the signal $f_1$, comprising in each case, a filter and a receiver (FA1 and AR1 at Terminal A., FB1 and BR1 at Terminal B) and a relay which, at Terminal A, is a relay AA having a normally-open contact AA1 and, at Terminal B, is a relay BA having normally-open contacts BA1, BA2 and BA3. The receivers AR1, BR1 may be voice-frequency signalling receivers of a kind well known in the art.

Relay AA is actuated by the detection of signal $f_1$ at Terminal A and the relay contact AA1 closes to prepare the energizing circuit of a relay AD, while relay BA is actuated by the detection of signal $f_1$ at Terminal B to close contacts BA1, BA2 and BA3. Operation of relay contact BA1 completes an energizing path for generator GEB through normally-closed relay contacts OVB1 and BK1 : this energizing path is an alternative to that which would be provided by a push-button start-up of the system from Terminal B rather than Terminal A as described above. Operation of relay contact BA2 prepares the energizing circuit of a relay BD (corresponding to relay AD at Terminal A) and operation of relay contact BA3 completes a dummy output path for the generator GEB through the relay contact BD1 (mentioned above), a current sensor CSB1 and series connected resistors RB1 and RB2. This dummy output path corresponds to that provided by circuit elements AD1, CSA1, RA1 and RA2 at Terminal A and described above, with resistors RB1 and RB2 being chosen to simulate the load that would be presented to the generator GEB by the coaxial cable L1 under normal operating conditions. It will be understood that relay contact BA3 is an alternative means of completing the dummy output path of generator GEB to that which would be provided by a push-button start-up of the system from Terminal B rather than Terminal A as described above. It will also be understood that the current sensor CSB1 may be of the same form as the sensor CSA1 already described.

Following energization of generator GEB and completion of the associated dummy output path, a second sequence of operations takes place, which is similar to the sequence, already described above, taking place after energization of generator GEA. This second sequence of operations may be summarized as follows.

i. The current supplied by the generator GEB to the dummy load RB1, RB2 (which current will flow in the same direction as that supplied by generator GEA since the polarities of the generators are reversed) is checked by the current sensor CSB1 and if the current is within the prescribed limits for the system, relay BE is actuated to operate a changeover contact BE1 and a normally-open contact BE2.

ii. Operation of changeover contact BE1 connects the low voltage tapping point at the junction of dummy load resistors RB1, RB2 into the impedance checking circuit that already exists through current sensors CSA2 and CSB2 but this is without effect since the circuit is so arranged that relays AF and BF associated with these sensors have already been actuated and remain actuated.

iii. Operation of relay contact BE2 completes the energizing circuit of relay BC which has already been prepared by closure of the contact BF1 of relay BF. Actuation of relay BC operates normally-open contacts BC1 and BC2.

iv. Operation of relay contact BC1 completes the energizing circuit from generator GEB to an oscillator OB which then generates a low-frequency monitoring signal $f_2$. The output circuit of the oscillator is transformer coupled at TB to the inner conductor C of the cable L1 so that the signal $f_2$ is transmitted along the cable to Terminal A. This signal $f_2$ is also used in the detection of any abnormality in the electrical condition of the cable in the same way as the signal $f_1$, as will also be described below.

v. Operation of relay contact BC2 in consequence of actuation of relay BC (see (iii) above) initiates actuation of a slow-operating relay BK through normally-closed relay contact BD3.

Means are provided at both Terminals A and B for detecting the signal $f_2$, comprising, in each case, a filter and a receiver (FA2 and AR2 at Terminal A; FB2 and BR2 at Terminal B) and a relay which, at Terminal B, is a relay BB having a normally-open contact BB1 and, at Terminal A, is the relay AB (mentioned above) having normally-open contacts AB1, AB2 and AB3.

Relay BB is actuated by the detection of signal $f_2$ at Terminal B and the relay contact BB1 closes to complete the energizing circuit of relay BD, which has already been prepared by operation of relay contact BA2 mentioned above. Relay AB is actuated by the detection of signal $f_2$ at Terminal A : this closes contacts AB1 and AB3 (but without effect since these contacts are merely in parallel with the push button contacts PA1 and PA2 respectively, which, at this time are still closed) and also closes contact AB2 to complete the energizing circuit of relay AD, which has already been prepared by operation of relay contact AA1 mentioned above. Following the closure of contacts AB1 and AB3, the push button PA can release (thereby opening contacts PA1 and PA2) without disturbing the sequence of operations.

Relay AD has the contacts AD1, AD2 and AD3 mentioned above and also a normally-open contact AD4 connected in a holding circuit for the relay AC, while relay BD has corresponding contacts BD1 to BD4 at Terminal B. Operation of relay AD moves contact AD1 from the dummy output position shown in FIG. 3 into a normal output position in which the output of generator GEA is connected to the inner conductor of the cable L1, and also opens contact AD2 to break the impedance checking path through current sensor CSA2 etc. Contact AD3 opens to break the energizing circuit of slow-acting relay AK (the operation of which has been initiated but not yet completed), while contact AD4 closes to complete the holding circuit of relay AC and thereby maintain the oscillator OA in operation despite the release of relays AE and AF. A similar set of events occurs at Terminal B as a result of operation of relay BD.

The normal operating condition of the system has now been reached, in which the D.C. power supply path for the repeaters R (see FIG. 1) of cable L1 is complete over the inner conductor C of the cable between the generators GEA, GEB so that the repeaters are energized and a high frequency information signal can be carried by the cable from a transmitter (not shown) at Terminal A to a receiver (not shown) at Terminal B. The push button PA at Terminal A has by now released and the generator GEA at this Terminal is being energised over the path provided by relay contacts OVA1, AB1 and AK1. In addition, the low frequency monitoring signals $f_1$ and $f_2$ are being generated at Terminals A and B respectively and are also being transmitted, in opposite directions, along the inner conductor C of the cable L1. This normal operating condition will be maintained for as long as the D.C. current supply of both generators GEA, GEB is maintained and for as long as the reception of the monitoring signals $f_1$ and $f_2$ continues.

Figure 2:
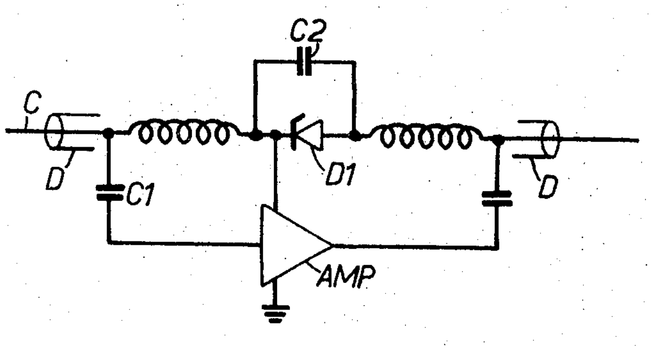
FIG. 2 is a diagram of a discriminating network which forms part of the power feed arrangement.

To enable the cable L1 to carry both the high frequency information signal and the low frequency monitoring signals $f_1$ and $f_2$, in addition to the D.C. energizing current, each of the repeaters R incorporates a discriminating network to separate the information signal (this being the signal that the repeater is required to amplify) from the D.C. and monitoring signals. A suitable form of network is illustrated in FIG. 2 and comprises three paths connected in the inner conductor C of the cable L1. One of the paths includes Zener diode D1, another includes capacitor C1 and the customary amplifying circuit AMP of the repeater, and the third path includes capacitor C2. The capacitor C1 is chosen so that it will pass the high-frequency information signal but will block the low-frequency monitoring signals $f_1$, $f_2$, while the capacitor C2 is chosen so that it will pass the monitoring signals but will block the information signal. Diode D1 passes the D.C. energizing current for the repeaters, and the amplifying circuit AMP is connected to receive the D.C. energizing signal from the diode input.

It will be appreciated that the normal operating condition of the system can only be achieved if :

a. the D.C. energizing current supplied by the generators GEA and GEB (as measured by the sensors CSA1 and CSB1 respectively) is within the prescribed limits for the system; and
b. the impedance of the cable L1 (as measured by the current flow through the sensors CSA2 and CSB2) is also within the prescribed limits for the system; and
c. the monitoring signals $f_1$ and $f_2$ have been detected at both the Terminals A and B. If condition (a) and or condition (b) is not satisfied, then generation of the monitoring signals $f_1$ and $f_2$ will not even commence. If one of the monitoring signals is generated but not detected (that is, condition (c) is not satisfied) then the appropriate one of the slow-acting relays AK, BK becomes effective in the following manner.

As described above, operation of relays AK, BK is initiated simultaneously with generation of the monitoring signals $f_1$ $f_2$ respectively. If signal $f_1$ is generated but not detected at Terminal A (filter FA1 and receiver AR1), then contact AD3 will not be actuated to break the energizing circuit of relay AK which will, accordingly operate after a certain time period so that the associated contact AK1 (mentioned above) connected in the energizing path of generator GEA will open. Similarly, if signal $f_1$ is not detected at Terminal B (filter FB1 and receiver BR1), then contact BD3 will not be actuated to break the energizing circuit of relay BK which will, accordingly operate after a certain time period and open the associated contact BK1 (mentioned above) in the energizing path of generator GEB. In the same manner, relay contacts AK1 and BK1 will also open if signal $f_2$ is not detected at Terminals A and B respectively (filters FA2, FB2 and the associated receivers AR2, BR2 respectively).

The power feed arrangement shown in FIG. 3 is also effective when the system is in operation to trip the generators GEA, GEB in the event of a substantial variation in the impedance characteristic of the cable L1, which could be caused by, for example, leakage in the cable or a disconnection. If such an impedance variation occurs then one or both of the monitoring signals $f_1$ $f_2$ will not be detected. Suppose, for example, that signal $f_1$ is not transmitted to Terminal B and is, therefore not detected at the filter FB1 and receiver BR1 : relay BA will then release and at the contact BA1 will break the energizing circuit of generator GEB and at the contact BA2 will break the energizing circuit of relay BD which will also release and, at contact BD1, will disconnect the generator GEB from the cable L1. Tripping of the generator GEB will terminate operation of the oscillator OB so that signal $f_2$ will cease and a similar set of circuit actions then occur at Terminal A to trip the generator GEA and disconnect the generator from the cable L1. It will be appreciated that, if the signal $f_2$ is not detected at Terminal A as a result of an impedance variation in the cable L1, then tripping of generator GEA will occur first followed by tripping of generator GEB. In a similar manner, the generators GEA and GEB will also be disconnected from the cable L1 if the signal $f_1$ is not detected at Terminal A or if the signal $f_2$ is not detected at Terminal B.

As an additional safeguard, the Terminals A and B include over voltage protecting relays OVA and OVB responsive to the output voltage of the generators GEA, GEB respectively to cause tripping of the generators in the event of a high-resistance condition occuring in the transmission line without affecting detection of the monitoring signals $f_1$ and $f_2$. For example, a fault might occur in one or both of the contacts AD1, BD1 connecting the generators to the cable L1 and give rise to an overvoltage condition without affecting the generation, transmission and detection of the monitoring signals. Such a fault would, however, cause the output voltage of the associated generator to rise and thereby operate the over voltage protecting relay OVA or OVB. The relays OVA, OVB have contacts OVA1 and OVB1 respectively (mentioned above) which open in response to the overvoltage condition to break the energizing circuit of the associated generator GEA, GEB and thereby terminate the supply of power to the cable L1.

It will be appreciated that a power feed arrangement corresponding to that shown in FIG. 3 would also be associated with generators GEA[1] and GEB[1] in the other half of the balanced system shown in FIG. 1 and that the two power feed arrangements operate independently of one another so that one half of the system can continue to operate in the event of the power supply to the other half being terminated.

Various modifications to the power feed arrangements shown in FIG. 3 are possible. For example, the check on the impedance of the cable L1 prior to the transmission of the monitoring signals need not be carried out by connecting the inner conductor C of the cable to a low voltage tapping point such as that provided by the junction of the dummy load resistors RA1, RA2 as described above.

As a further modification, the relays AE, AF, BE and BF shown as associated with the current sensors CSA1, CSA2, CSB1 and CSB2 respectively in FIG. 3 could, in fact, be incorporated in the sensors. In addition, indicator lamps could be incorporated in the system as required to provide a visual indication of the state of the power feed arrangement at any time.

As another modification, the monitoring signals could be transmitted along conductors separate from the conductors provided to carry the information signals. It is, however, preferable that the monitoring signals should be transmitted along the same conductor as the information signals as illustrated in FIG. 3, thereby ensuring that all faults arising in this conductor can be detected.

We claim:

1. A power feed arrangement for a communications system which includes two terminal stations; a transmission path connecting the terminal stations to transmit information signals from one of the stations to the other; a respective energizing current supply source at each station, and information signal repeating means connected in the transmission path and energizable by current supplied along the transmission path from the energizing current supply sources, said power feed arrangement including, at each station:

- a monitoring signal generator operable to apply, to the transmission path, a monitoring signal which is to be transmitted to the other station,
- a first detector connected to the transmission path to receive the monitoring signal transmitted to that station from the other station, said first detector being operable, in response to a failure to receive a monitoring signal from the other station, to disconnect the energizing current supply sources from the transmission path, and
- a second detector connected to the transmission path to receive the monitoring signal applied to the transmission path at that station, the second detector being operable, in response to a failure to receive the monitoring signal applied at that station, to disconnect the energizing current supply sources from the transmission path.

2. A power feed arrangement as claimed in claim 1, including means operable to connect the energizing current supply sources to the transmission path only in response to the detection, at both stations, of the monitoring signals applied to the transmission path at both stations.

3. A power feed arrangement as claimed in claim 1, in which each detector is operable to disconnect, from the transmission path, the energizing current supply source located at the same station.

4. A power feed arrangement as claimed in claim 3, in which each detector is operable simultaneously to terminate the application of a monitoring signal to the transmission path by the monitoring signal generator located at the same station.

5. A power feed arrangement as claimed in claim 1, including means operable to test the current output of the energizing current supply sources prior to operation of the monitoring signal generators.

6. A power feed arrangement as claimed in claim 5, in which the current testing means is operable in response to energization of each current supply source.

7. A power feed arrangement as claimed in claim 5, in which the current testing means includes switching means operable to connect each current supply source to an electrical load representative of the load that would normally be presented to that source by the transmission path, and a current sensor for measuring the current supplied by said source to said representative load.

8. A power feed arrangement as claimed in claim 5, in which the monitoring signal generators are operable to apply monitoring signals to the transmission path only in response to the detection, by the current testing means, of a normal current output from the energizing current supply sources.

9. A power feed arrangement as claimed in claim 1, including means operable to test the electrical impedance of the transmission path prior to operation of the monitoring signal generators.

10. A power feed arrangement as claimed in claim 9, in which the impedance testing means is operable in response to energization of one of the current supply sources.

11. A power feed arrangement as claimed in claim 9, in which the impedance testing means includes switching means operable to connect the transmission path, through a current sensor, to a test source of substantially lower voltage than the energizing current supply sources.

12. A power feed arrangement as claimed in claim 9, in which the monitoring signal generators are operable to apply monitoring signals to the transmission path only in response to the detection, by the impedance testing means, of a normal electrical impedance condition in the transmission path.

13. A power feed arrangement as claimed in claim 1, including a respective protector for each current supply source, the protector being operable in response to a voltage greater than a predetermined value at the current supply source output to disconnect the current supply source from the transmission path.

14. A communications system which includes a power feed arrangement as claimed in claim 1, and in which the transmission path includes an electrical conductor connected to transmit both information signals and monitoring signals.

15. A communications system as claimed in claim 14, including, at each repeating means, a discriminating network connected in the transmission path for separating the monitoring signals from the information signals to apply only the information signals to the repeating means.

16. A communications system which includes a power feed arrangement as claimed in claim 1, and in which the transmission path includes an electrical conductor which is connected to transmit the monitoring signals and which is separate from the conductor connected to transmit the information signals.

17. A communications system which includes two transmission paths each having a respective power feed arrangement as claimed in claim 1, the transmission paths connecting two terminal stations to transmit information signals in opposite directions between the stations.

* * * * *